US010316912B2

(12) United States Patent
Crippa et al.

(10) Patent No.: US 10,316,912 B2
(45) Date of Patent: Jun. 11, 2019

(54) DISC BRAKE PAD, SPRING FOR DISC BRAKE CALIPER AND DISK BRAKE CALIPER ASSEMBLY

(71) Applicant: FRENI BREMBO S.P.A., Curno (IT)

(72) Inventors: Cristian Crippa, Curno (IT); Fabio Scotti, Curno (IT); Mirko Castellana, Curno (IT)

(73) Assignee: Freni Brembo S.P.A. (IT)

( * ) Notice: Subject to any disclaimer, the term of this patent is extended or adjusted under 35 U.S.C. 154(b) by 0 days.

(21) Appl. No.: 15/302,923

(22) PCT Filed: Apr. 8, 2015

(86) PCT No.: PCT/IB2015/052549
§ 371 (c)(1),
(2) Date: Oct. 7, 2016

(87) PCT Pub. No.: WO2015/155708
PCT Pub. Date: Oct. 15, 2015

(65) Prior Publication Data
US 2017/0037916 A1    Feb. 9, 2017

(30) Foreign Application Priority Data
Apr. 8, 2014  (IT) .............................. MI2014A0657

(51) Int. Cl.
*F16D 65/097* (2006.01)
*F16D 65/12* (2006.01)
(Continued)

(52) U.S. Cl.
CPC ..... *F16D 65/0977* (2013.01); *F16D 55/2265* (2013.01); *F16D 65/0006* (2013.01); *F16D 65/12* (2013.01); *F16D 2055/0041* (2013.01)

(58) Field of Classification Search
CPC ............ F16D 55/2265; F16D 65/0977; F16D 65/0006; F16D 65/12; F16D 2055/0041; F16D 2055/007
(Continued)

(56) References Cited

U.S. PATENT DOCUMENTS 4,417,647 A * 11/1983 Cotter ................ F16D 65/0976
188/73.38
4,460,067 A    7/1984 Katagiri et al.
(Continued)

FOREIGN PATENT DOCUMENTS

EP    0248385 A1    12/1987
EP    0694707 A2    1/1996
(Continued)

OTHER PUBLICATIONS

International Search Report dated Sep. 25, 2015 in corresponding PCT patent application No. PCT/IB2015/052549.
(Continued)

*Primary Examiner* — Thomas W Irvin
(74) *Attorney, Agent, or Firm* — Waller Lansdsen Dortch & Davis, LLP; Matthew C. Cox

(57) ABSTRACT

The invention relates to a brake pad (12,13) of a disc brake (2) comprising a support plate (15) having a thrust surface (18) to receive the thrust of at least one piston, and a friction surface (19) to which a friction portion (16) is associated, associated to said support plate (15) to rest on a friction surface (4,5) of said brake disc (2), said pad comprising a support plate edge (17) which delimits said thrust surface (18) and friction surface (19), said thrust plate edge (17) comprising an upper edge portion (28), substantially facing or directed outwards in the outward sense (RE) of said radial direction (R-R), said thrust plate edge (17) comprising an
(Continued)

upper edge portion (20), substantially facing or directed in the inward sense (RI) of said radial direction (R-R), said thrust plate edge (17) comprising two lateral edge portions (21, 22) opposite each other and substantially facing or directed in the tangential direction (T-T), said lateral edge portions (21, 22) each comprising a lower lateral edge sub-portion (30), next to the lower edge portion (20), which extends by an extension less than or equal to a third of the longitudinal extension of said lateral edge portion (21, 22), wherein said upper edge portion (18) of said thrust plate edge (17) comprises at least one tab (23) forming a seat (24), open or closed, and defining a spring surface (25) facing or directed substantially in an inward direction (RI) in said radial direction (R-R), to receive and support a thrust portion (26) of a spring device (27) adapted to stress the brake pad with at least one direct thrust component in the outward direction (RE) of said radial direction (R-R), and wherein all along said upper edge portion (28) there is no upper support portion of the caliper body (8), superiorly avoiding the support of the plate or of the pad by the caliper body (8) to exert a reaction to the thrust component having an outward sense (RE) of said radial direction (R-R) to the stress action of the spring device (27); and wherein a portion of the support plate (15) which is delimited by said lower lateral edge sub-portion (30), and/or by said lower edge portion (20), comprises a lower portion resting on the support plate (15) of the caliper body, defining a caliper support surface resting on the support plate of the caliper body to exert a reaction to the thrust component of the spring device (27); and wherein said caliper support surface (32) substantially faces, or has a sense, in the outward sense (RE) of said radial direction (R-R) to rest directly or indirectly on the caliper body (8), so that said pad is pulled radially outwards substantially in its entire radial extension, in the outward sense (RE).

9 Claims, 10 Drawing Sheets

(51) Int. Cl.
*F16D 55/2265* (2006.01)
*F16D 65/00* (2006.01)
*F16D 55/00* (2006.01)

(58) Field of Classification Search
USPC .................. 188/73.1, 73.38, 250 R, 250 G
See application file for complete search history.

(56) References Cited

U.S. PATENT DOCUMENTS

| | | | | |
|---|---|---|---|---|
| 4,469,205 | A | * | 9/1984 | Stoka ................. F16D 65/0978 188/234 |
| 4,699,255 | A | * | 10/1987 | Claverie .............. F16D 55/224 188/73.38 |
| 4,844,206 | A | | 7/1989 | Casey |
| 5,064,028 | A | * | 11/1991 | Antony ................ F16D 65/092 188/250 E |
| 5,588,508 | A | * | 12/1996 | Le Deit ............... F16D 65/092 188/73.1 |
| 5,941,348 | A | | 8/1999 | Matsumoto et al. |
| 6,932,199 | B2 | * | 8/2005 | Emmett .............. F16D 65/0972 188/250 B |
| 7,458,447 | B2 | * | 12/2008 | Thomas ............... F16D 55/226 188/205 A |
| 8,496,093 | B2 | * | 7/2013 | Kreuzeder .......... F16D 65/0976 188/1.11 L |
| 9,726,243 | B2 | * | 8/2017 | Radhakrishnan ... F16D 65/0977 |
| 2002/0038742 | A1 | | 4/2002 | Bunker |
| 2004/0104086 | A1 | | 6/2004 | Katoh |
| 2004/0168868 | A1 | * | 9/2004 | Thomas .............. F16D 65/0977 188/73.37 |
| 2004/0262099 | A1 | * | 12/2004 | Crippa .................. F16D 55/22 188/73.35 |
| 2010/0252370 | A1 | | 10/2010 | Raffin et al. |
| 2013/0068573 | A1 | | 3/2013 | Freund et al. |
| 2016/0146278 | A1 | * | 5/2016 | Roberts ................ F16D 55/226 188/73.38 |
| 2017/0102042 | A1 | * | 4/2017 | Crippa ............... F16D 65/0977 |

FOREIGN PATENT DOCUMENTS

| | | |
|---|---|---|
| EP | 0877176 A2 | 11/1998 |
| EP | 1441141 A1 | 7/2004 |
| EP | 1709341 A1 | 10/2006 |
| EP | 2141380 A1 | 1/2010 |
| GB | 2178807 A | 2/1987 |
| JP | S5857528 A | 4/1983 |
| JP | S5899527 A | 6/1983 |
| JP | H04262131 A | 9/1992 |
| JP | H07158669 A | 6/1995 |
| JP | H07229526 A | 8/1995 |
| JP | 2002276703 A | 9/2002 |
| JP | 2006090392 A | 4/2006 |
| JP | 2007146969 A | 6/2007 |
| WO | 9200465 A1 | 1/1992 |
| WO | 9217713 A1 | 10/1992 |

OTHER PUBLICATIONS

Written Opinion dated Sep. 25, 2015 in corresponding PCT patent application No. PCT/IB2015/052549.

* cited by examiner

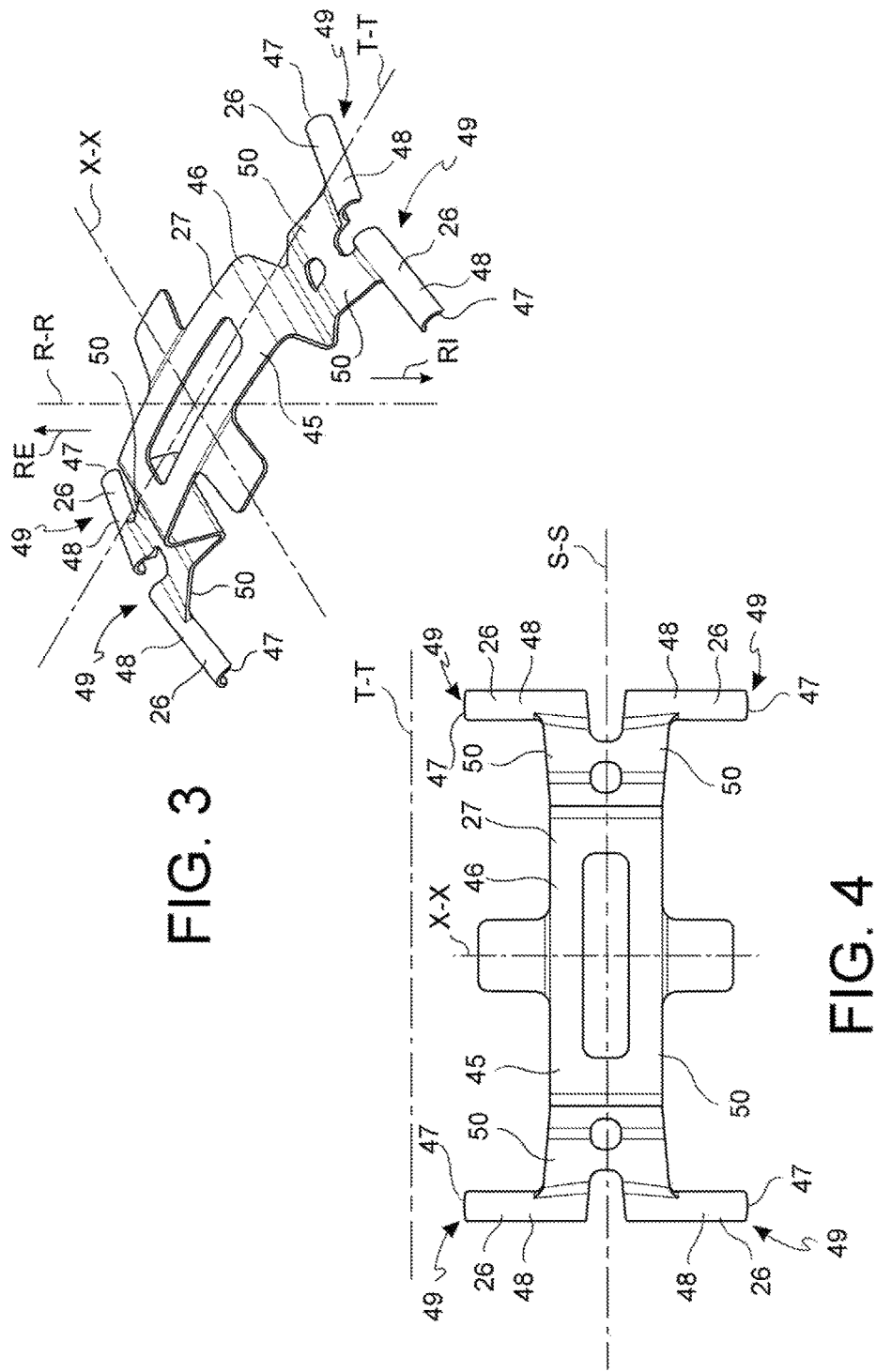

(state of the art)

DISC BRAKE PAD, SPRING FOR DISC BRAKE CALIPER AND DISK BRAKE CALIPER ASSEMBLY

FIELD OF APPLICATION

The present invention relates to a pad for a disc brake caliper, a spring for a disc brake and a disc brake caliper assembly comprising such pad and such spring.

In more detail, the invention relates to a brake pad of the disc brake which constitutes a new type of pad differing from pads resting on the caliper body and pads suspended on pins.

DESCRIPTION OF THE PRIOR ART

As known, in disc brake calipers opposite pads are pressed, thanks to the action of at least one piston, against the opposite braking surfaces of a braking band of the associable brake disc. In the release phase of braking, the at least one piston ceases to exert the thrust action; however, the pad which is placed in contact with the braking band tends to remain in place, generating a residual braking torque as well as an annoying noise noticeable even by users of the vehicle.

For this reason, it is known of to fit the calipers with springs which exert a thrust action on the brake pads away from the brake disc. Obviously during braking such thrust action away from the brake disc is overcome by the braking action exerted by the pistons, but in the release phase, said springs exert a thrust sufficient to distance the pads from the braking surfaces of the brake disc, avoiding contact between the pads and the brake disc when no braking action is required.

In some known solutions, such springs also exert a thrust action on the pads in a tangential direction, in order to support the pad, in particular the pad plate on a dedicated support surface provided in the caliper body. This support is ensured on the working side of the pad in the forward gear of the vehicle, so as to bring the pad into position to discharge the braking action exerted on the brake disc on the caliper body, preventing the sensation of a settling and abutment stroke between the brake pad plate and the caliper at the beginning of the braking action of the vehicle.

The solutions for caliper springs for disc brakes of the prior art are not without drawbacks and disadvantages.

For example, the document US2010252370A1 by KNORR BREMSE SYSTEME, shows a disc brake pad holder in particular for a commercial vehicle, in which the brake pads are placed on both sides of a brake disc. These pads are pressed by a respective pad spring pressed by an overlying stop element or clip constrained to the caliper body, which extends in the axial direction of the brake disc.

This known solution presses the pad in a radial direction resting on a protuberance of the caliper body which obstructs the seat or pocket which the pad is housed in, creating difficulties in the ventilation and cooling of the housing area of the pad and of the thrust means, in this case the cylinder-hydraulic piston units. Furthermore, this known solution acts on the pad compressing it between the spring, placed radially on the outside, and its distant support, placed radially inside, facilitating jamming of the sliding of the pad on its support at the moment in which, pushed by the spring, it moves away from the disc. This drawback reappears in all the solutions where the pad is compressed by the spring, such as for example also in the solution disclosed by EP1441141B1 and EP0877176 belonging to MERITOR HEAVY VEHICLE BRAKING, or WO9200465 belonging to KNORR BREMSE AG, or EP0248385 belonging to LUCAS IND PLC, or EP0694707 belonging to PERROT BREMSEN GMBH.

For this reason, in some applications, it is preferable to have the brake pad hung or suspended, so as to move closer together the constraint, in this case a suspension pin of the pad, and the spring.

For example, JP2002276703A belonging to TOKICO LTD discloses a disc brake with a caliper body having pairs of cylinder-piston units arranged in opposite positions with the interposition of a brake disc rotor, provided with a bridge portion which straddles the rotor and having a pair of brake pads slidingly suspended from a pad pin also positioned to bridge an inner open part of the caliper body bridge and having a spring which presses each brake pad inwards in a radial direction of the disc in the manner of a cover and covers a part of the opening; the spring cover is provided with a part resting on the pad pin and is formed of a tape.

This known solution, while reducing the probability of jamming of the pad while moving away from the brake disc, given that the spring acts on the pad in a hanging portion thereof placed radially inwardly with respect to the pad pin, entails a greater distancing of the portion of the pads placed radially most inwardly.

A similar solution, albeit simplified, is shown in FIG. 15. A pair of pads 11, 12 is placed facing a disc 2 of a disc brake 3, suspended from a pin pad 51. A spring 52 presses the brake pads, in particular the plates of the pads away from the disc. Notoriously, the disc 2 during its operation tends to deform more in its annular portion further away from the rotation axis, i.e. from its constraint to the wheel hub of the vehicle, determining a deformation or axial vibration of said outer annular portion, in FIG. 15 shown by the dotted line, which moves the disc 2 towards the pads 11, 12, sometimes resulting in an undesirable contact which generates an undesirable residual braking torque which leads to a slight deceleration of the vehicle, vibration and sometimes annoying noises if not whistling.

Similar solutions are known from JPH07158669A belonging to NISSIN KOGYO KK, or JPS5857528A belonging to NISSAN MOTOR, or EP1709341B1 belonging to Freni Brembo S.p.A. itself.

These solutions of pads suspended and pressed by springs in a radial direction, or pressed radially inwards, have the further drawback that the distance in the radial direction between the point of support with the caliper body or with the pin pad, and the point of support of the spring with the pad is small, or in other words, much lower than the radial extension of said pad (even less than a third of the radial extension of the entire pad). This small arm (the radial distance between the pad support constraint contact point and the point of contact and thus of action of the spring) requires the use of very stiff springs, i.e. with very high elastic constants, making the production of the springs very complex, since even a small constructive tolerance results in considerable load variations on the pad, and thus a behaviour of the pad unplanned for in the design.

Other similar solutions, despite reversing the constraint and thrust points are disclosed in JPS5899527A belonging to AKEBONO BRAKE IND, or JP2007146969A belonging to HITACHI LTD, or U.S. Pat. No. 4,844,206A belonging to ALLIED SIGNAL INC, or US2002038742A1 belonging to FEDERAL MOGUL TECHNOLOGY LTD, or U.S. Pat. No. 4,046,232A belonging to GEN. MOTORS CORP.

It is important to underline how in general, in some of the known solutions mentioned above, the pads are still guided axially, i.e. parallel to the rotation axis of the associable brake disc, by pins or guides which slide in suitable holes made in the support plates of said pads. In this case, the thrust exerted by the springs of the prior art is not aligned with said axial guides of the pads. This determines a friction action between the pins and the relative holes which, together with the axial thrust exerted by the plates, generates a torque on said pad.

This torque tends to make the pad rotate distancing its radially innermost portion with negative effects both in terms of retraction and in terms of wear of said pads.

In fact, the rotation of the pad tends to make it jam on the guide and prevent a full retraction sufficient to eliminate all the residual torque. In addition, the portion of pad which remains in contact with the brake disc is prone to wear and thus to generating abnormal consumption of the braking surface of the pad.

Moreover, such anomalous consumption also affects the efficiency of braking and can generate the occurrence of vibrations and noise during said braking.

Solutions are also known where the pad, albeit suspended, is pressed by springs in compression, for example with radial stresses outward from their lower side, re-presenting the problems of jamming seen in the solutions of pads supported and flattened or pressed radially inwards.

Examples of solutions of this type are known from EP2141380A1 belonging to ROBERT BOSCH GMBH, or JPH04262131A belonging to LUCAS IND PLC, or U.S. Pat. No. 4,460,067A belonging to TOYOTA MOTOR CO LTD AISIN SEIKI, or US2004104086A1 belonging to ADVICS CO LTD, or JPH07229526A belonging to SUZUKI MOTOR CO, or JP2006090392A belonging to ADVICS KK, or GB2178807A belonging to AUTOMOTIVE PRODUCTS PLC.

Solutions are also known where the pad is pulled outwardly opposing the thrust of the spring which influences it radially outwards in the vicinity of its outer radial portion, such as in US2013068573A1 belonging to Continental Teves AG or WO9217713A1 belonging to Alfred Teves GmbH. These known solutions have the points of application of the elastic thrust and of the constraint reaction close together, at a distance less than half the radial extension of the pad and in particular the contact surfaces between the plate and the caliper body, i.e. the constraint reaction surfaces, placed near the upper edge or above the centreline of the pad. These solutions do not allow the friction material, to be subjected in its entirety, to the traction action.

SUMMARY OF THE INVENTION

The need is thus felt to reduce the residual torque determined by the undesired contact of the pad with the brake disc, especially of the residual torque determined by accidental and unwanted contact of the radially outer annular portion of the disc which, being distant from its constraint (the hat attached to the stub axle of the vehicle), deforms more in the axial direction X-X, going to interfere with the friction portion of the brake pad.

The need is thus felt to distance the pad from the brake disc which is deformed above all in its radially outermost crown.

At the same time, the contrasting need is strongly felt to distance the pad as little as possible from the friction surfaces of the disc to have a braking device ready or reactive to the braking request by the driver.

The objective of the present invention is therefore to devise and make available a brake pad for a disc brake of new conception which, despite being suspended does not rotate, moving further away from the disc in the axial direction at its radially innermost portion.

A further objective of the present invention is to devise and make available a brake pad for a disc brake of new conception which is pulled in the radial direction by the action of an elastic device associated thereto, at least for most of its radial extension.

It is a further objective of the present invention to devise and make available a brake pad for a disc brake of new conception which increases the distance, in a radial direction, between the point of application of the elastic action on the pad and the point in which the brake pad rests on the caliper body.

It is a further objective of the present invention to devise and make available a spring, for example but not necessarily a shaped leaf spring, which makes it possible to influence the pads associated to the caliper body of a disc brake and which makes it possible to push the pads away from the disc of the disc brake, avoiding creating annoying vibrations and high frequency noises or whistling and preventing the pads from vibrating against the braking surfaces of the disc, remaining in proximity of the disc even when the braking action is not required creating an unwanted residual braking torque.

This problem is resolved by a brake pad as defined in the appended claim 1, and by a spring according to claim 7. The present invention also relates to a caliper assembly of a disc brake according to the appended claim 11, and a method of distancing the brake pads from the brake disc according to claim 9.

According to a general embodiment of the invention, a disc brake pad comprises a support plate having a thrust surface to receive the thrust of at least one piston, and a friction surface to which a friction portion is associated, associated to said support plate to rest on a friction surface of said brake disc.

Said pad comprises a support plate edge which delimits said thrust surface and friction surface. Said thrust plate edge comprises an upper edge portion substantially facing or directed in the outward sense of a radial direction. Said thrust plate edge comprises a lower edge portion substantially facing or directed in inward sense of said radial direction. Said thrust plate edge further comprises two lateral edge portions opposite each other and substantially facing or directed in a tangential direction, said lateral edge portions each comprising a lower lateral edge sub-portion next to the lower edge portion which extends for an extension less than or equal to a third of the longitudinal extension of said lateral edge portion.

Advantageously, said upper edge portion of said of the thrust plate edge comprises at least one tab forming a seat, open or closed, and defining a surface of the spring facing or directed substantially in the inward sense of said radial direction, to receive in abutment a thrust portion of a spring device adapted to press the brake pad with at least one thrust component directed in the outward sense of said radial direction. To particular advantage, all along said upper edge portion there is no upper support portion of the caliper body, superiorly avoiding the support of the plate or of the pad by the caliper body, to exert a reaction to the thrust component having an outward direction of the stress action of the spring device.

According to one embodiment, a portion of the support plate which is delimited by said lower lateral edge sub-portion and/r by said lower edge portion, comprises a lower portion resting on the caliper body plate, defining a caliper support supporting the plate on the caliper body to exert a reaction to the thrust component of the spring device.

According to one embodiment, said caliper support surface substantially faces, or has a direction, in the outward sense of said radial direction to rest directly or indirectly on the caliper body, so that said pad is pulled radially outwards substantially in its entire radial extension, in the outward sense.

This proposed solution creates a new type of pad which, while being suspended, is pulled radially outwards.

In particular, this new type of pad is elastically suspended from a spring device, avoiding resting on the caliper body on the same side of the plate edge where the elastic action of the spring device is applied.

DESCRIPTION OF THE DRAWINGS

Further characteristics and advantages of the shaped leaf spring for a disc brake according to the invention will, in any case, be evident from the description given below of its preferred embodiments, made by way of a non-limiting example with reference to the appended drawings, wherein:

FIG. 3 is an axonometric view of a shaped leaf spring;

FIG. 4 is a view from above of the leaf spring in FIG. 3;

DETAILED DESCRIPTION

Figure 1:
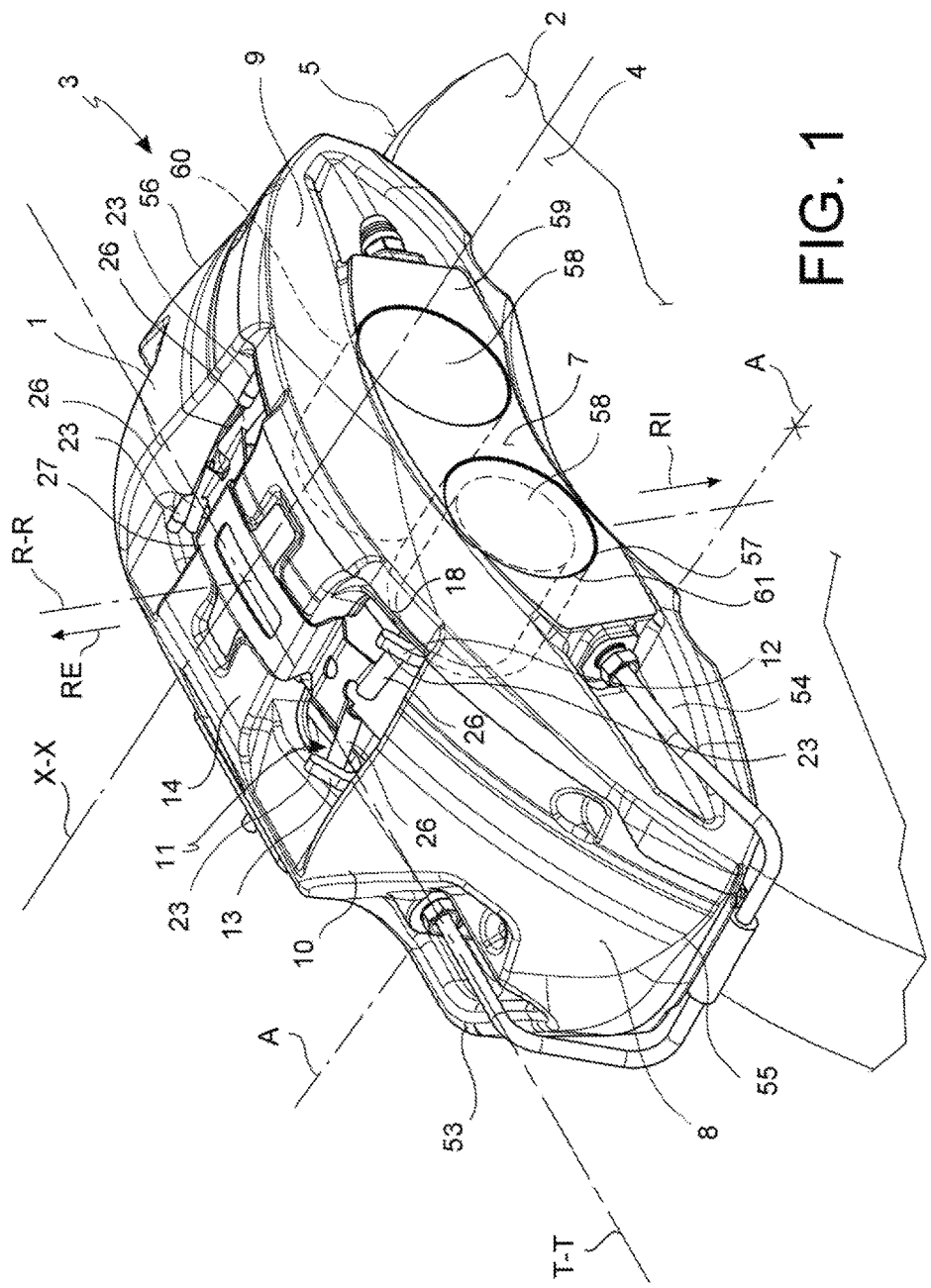
FIG. 1 is an axonometric view of a caliper assembly for a disc brake having a limited thickness in the axial direction, in which pads supported and pressed by a spring interposed between said pads are fitted.
Figure 2:
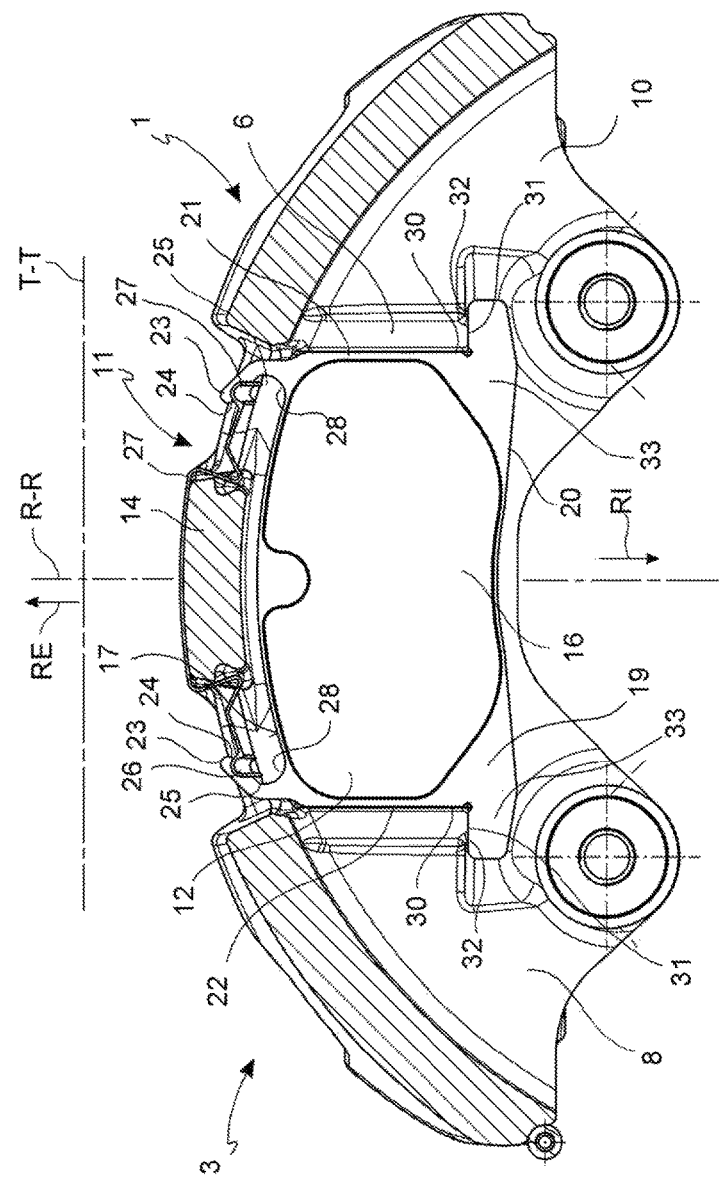
FIG. 2 is a longitudinal cross-section view of the caliper for a disc brake in FIG. 1.
Figure 5:
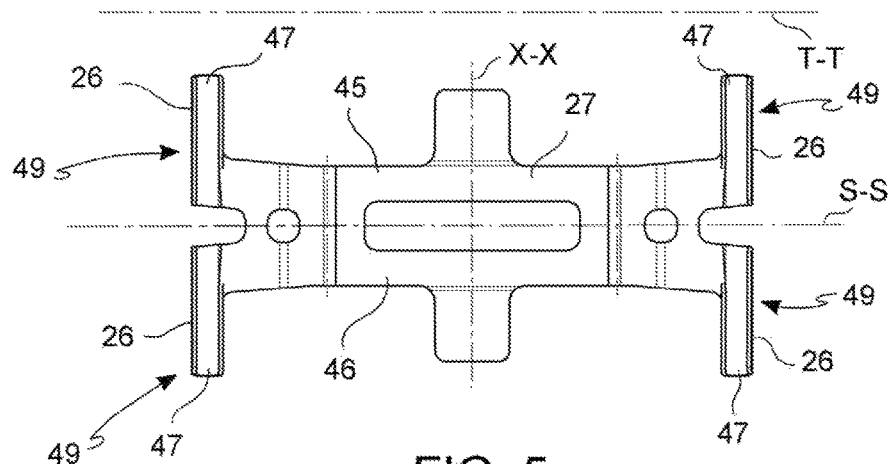
FIG. 5 is a view from below of the leaf spring in FIG. 3.
Figure 6:
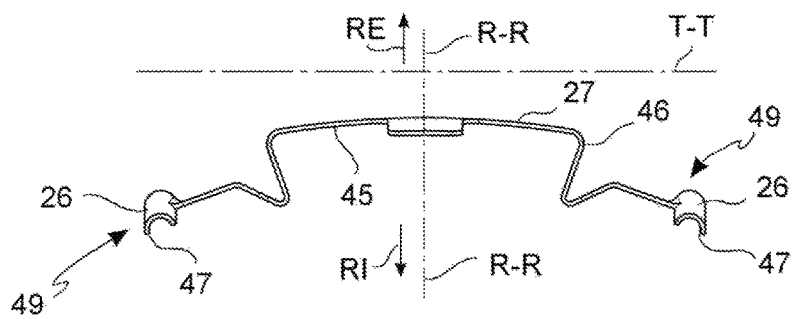
FIG. 6 is a side view, on the brake pad side, of the shaped leaf spring in FIG. 3.
Figure 7:
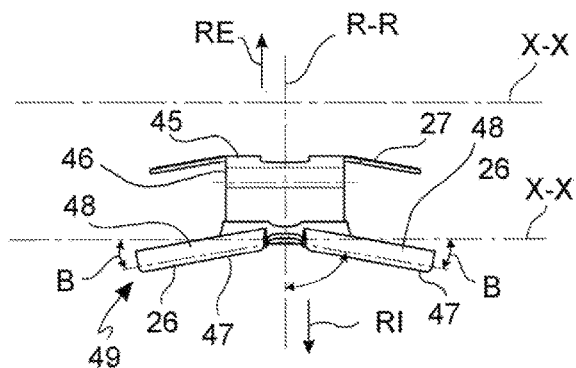
FIG. 7 is a view, in a direction orthogonal to the rotation axis of the associable brake disc, of the shaped leaf spring in FIG. 3.
Figure 8:
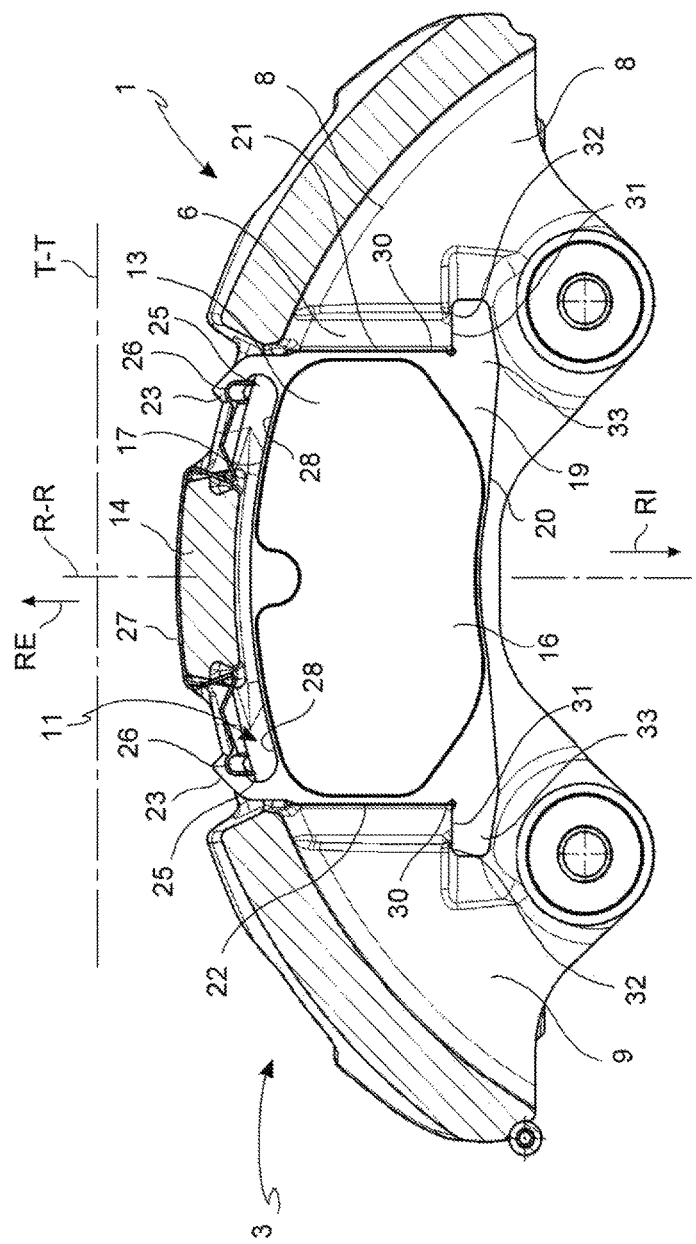
FIG. 8 is a longitudinal cross-section of a brake caliper assembly according to a further embodiment.
Figure 9:
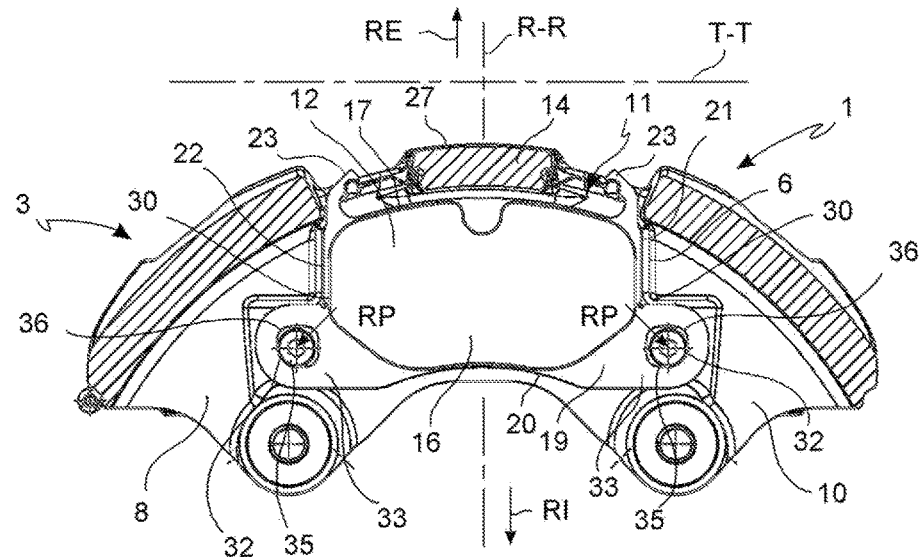
FIG. 9 is a longitudinal cross-section of a brake caliper assembly according to a further embodiment.
Figure 10:
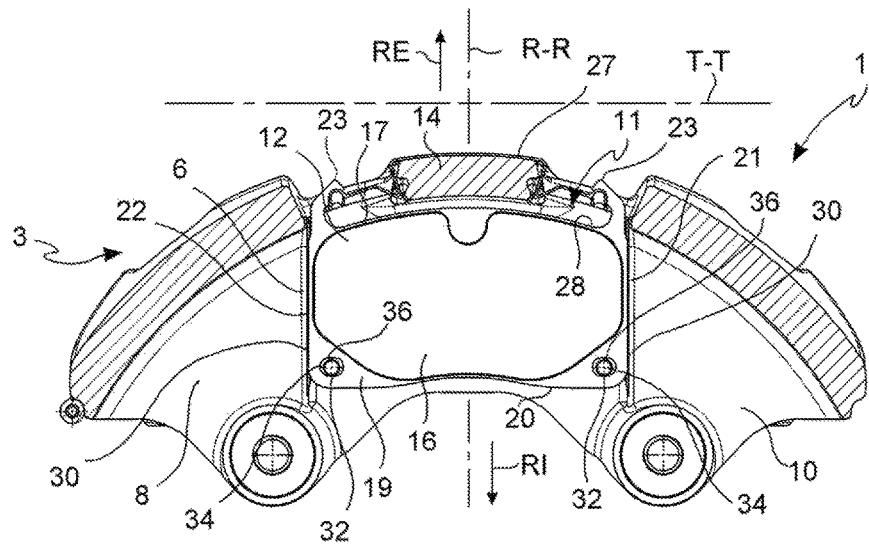
FIG. 10 is a longitudinal cross-section of a brake caliper assembly according to a further embodiment.
Figure 11:
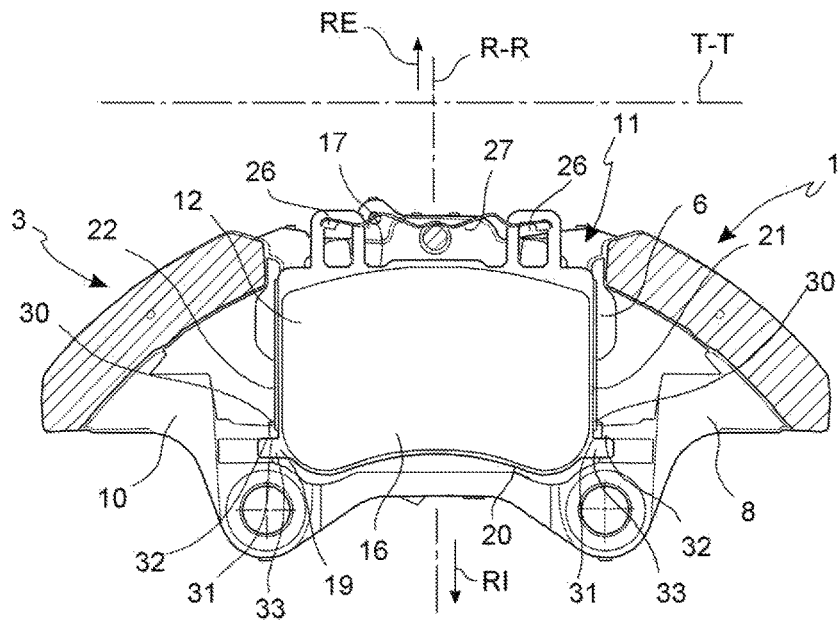
FIG. 11 is a longitudinal cross-section of a brake caliper assembly according to a further embodiment.
Figure 12:
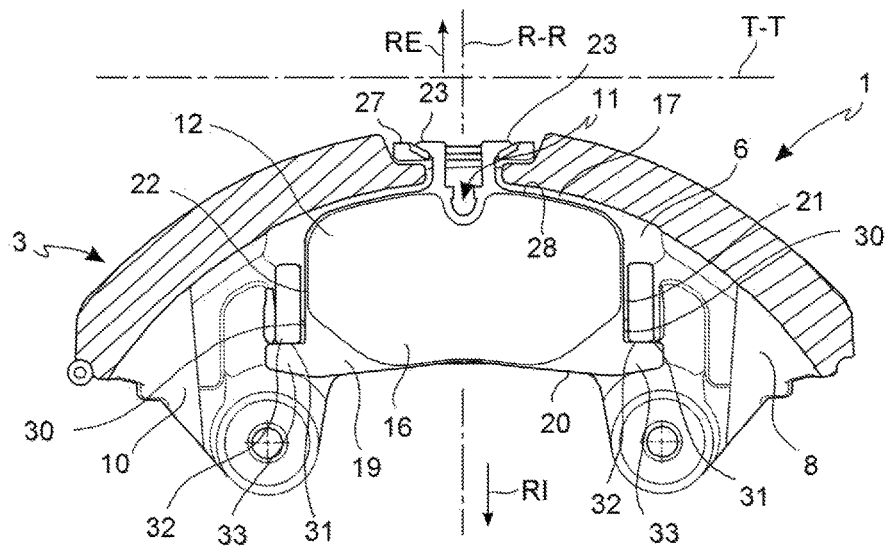
FIG. 12 is a longitudinal cross-section of a brake caliper assembly according to a further embodiment.
Figure 13:
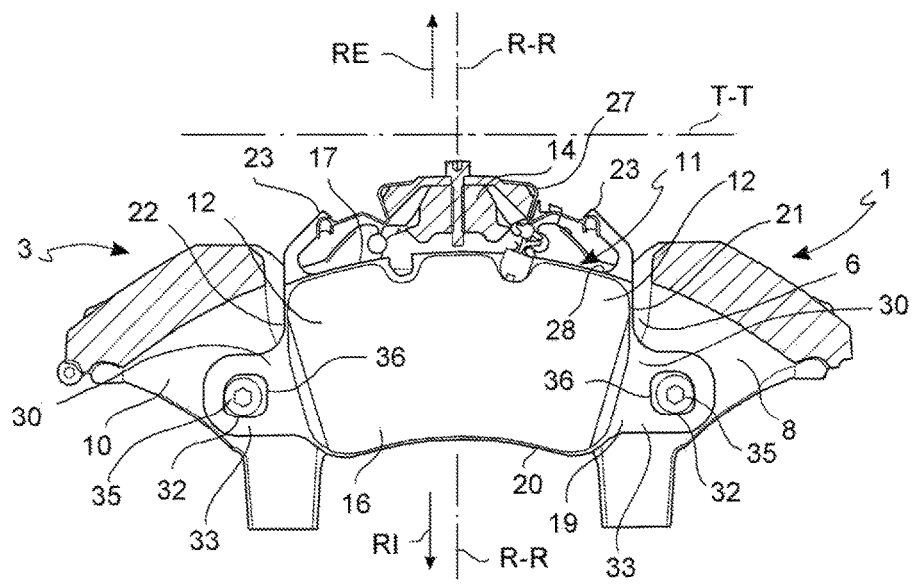
FIG. 13 is a longitudinal cross-section view of the caliper for a disc brake in FIG. 14.
Figure 14:
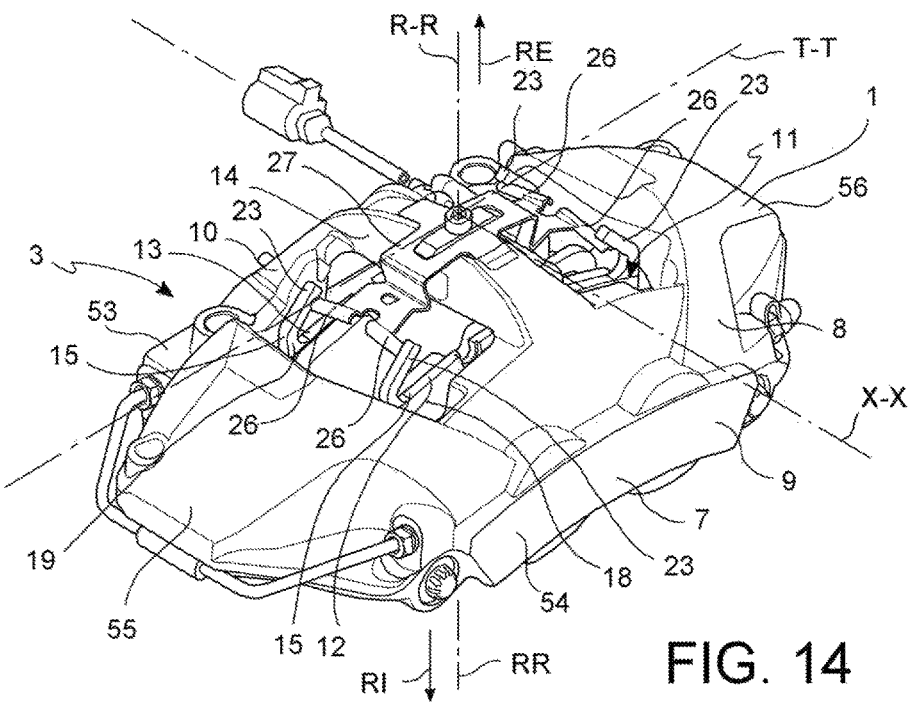
FIG. 14 is an axonometric view of a caliper assembly for a disc brake, according to a further embodiment, in which pads supported and pressed by a spring interposed between said pads are fitted.

With reference to the drawings, reference numeral 1 globally denotes a disc brake caliper, comprising a caliper body 8 having a pair of half-bodies or half-calipers 9, 10 adapted to define a housing compartment 11 for a portion of an associable brake disc 2.

The half-calipers 9, 10 are positioned on opposite sides to the housing compartment 11 in an axial direction X-X parallel to the rotation axis of the associable brake disc. Said axial direction X-X is also parallel to the direction of movement of the thrust pistons of the pads of the caliper 1, as well as the rotation axis A-A of the disc 2.

According to one embodiment, the half-calipers 9, 10 may be separate from each other and joined for example by mechanical coupling means, or the half-calipers 9, 10 may be made in one piece, i.e. by making a caliper body 8 of the monobloc type.

According to one embodiment, each half-caliper 9, 10 is made of aluminium or of an aluminium alloy.

Said caliper 1 has elongated elements 53, 54 substantially facing the disc, for example an elongated element on the vehicle side 53 and an elongated element on the wheel side 54, joined together by end bridges 55, 56.

The caliper body 8 may be fixed or floating, i.e. fitted with thrust means in both the half-calipers 9, 10, or have thrust means only on one side of the disc and associated with a portion of the caliper body, or floating, sliding on guides or pins on a second portion of the caliper body or bracket.

The housing compartment 11 delimited by the caliper body 8 is configured to house at least one pair of pads 12, 13 positioned on opposite sides to said housing compartment 11, in the axial direction X-X.

According to one embodiment, the housing compartment 11, is the shape of a sector of a disc and is radially delimited, according to another embodiment, by a central connecting bridge 14 of the half-calipers 9, 10.

The axial direction X-X is taken to mean a direction parallel to the rotation axis A-A of the disc 2, while the radial direction R-R is taken to mean a direction perpendicular to the axial direction X-X and directed towards the rotation axis of the associable brake disc. The circumferential or tangential direction T-T is taken to mean a direction in any point orthogonal to said axial direction X-X and said radial direction R-R.

The pads 12,13 comprise a support plate 15 and a friction portion 16 suitable for exerting a friction force on the associable brake disc, in particular on opposite friction surfaces 4, 5 of the brake disc 3. The support plate 15 and the friction portion 16 may be made in separate parts, preferably in different materials, subsequently assembled together, or the pads 12, 13 may also be made in one piece.

In the case of a fixed type caliper 1, and according to one embodiment, each half-caliper 9, 10 is provided with at least one housing seat for a piston suitable to press a brake pad 12; 13 against the associable brake disc 2, in the axial direction X-X. Each half-caliper 9, 10 may comprise a plurality of housing seats and relative pistons housed therein.

According to one embodiment, in each half-caliper 9, 10, the housing seat of a piston is of the type passing through the half-caliper 9, 10 i.e. extending between an inner wall of the half-caliper 6 facing the housing compartment 11 and an outer wall 7 of the half-caliper 9, 10, axially opposite said housing compartment 11.

According to one embodiment, said housing seat is typically a cylindrical seat having an axis of symmetry parallel to said axial direction X-X.

According to one embodiment, at the housing seat of a piston, the half-caliper 9, 10, comprises a hollow cup-shaped insert 57 provided with a closed bottom 58 positioned on the outer wall 59 of the half-caliper. Said insert is made of metal, for example steel, or other materials, such as carbon, ceramic and/or plastic reinforced with carbon and the like.

The pads 12, 13 comprise a support plate 15 and a friction portion 16 suitable for exerting a friction force on the associable brake disc. The support plate 15 and the friction portion 16 may be made in separate parts, preferably in different materials, subsequently assembled together, or the pads 12, 13 may also be made in one piece.

The present invention applies to any type of pad and/or caliper body: it therefore also applies to calipers 1 having two or more pads for each half-caliper 9,10.

According to one embodiment, the thrust means are for example a cylinder-piston group. For example, the piston 61 is preferably hydraulically driven, but the drive can also be pneumatic or electro-mechanical. The piston 61 preferably has a cylindrical geometry.

The piston 61 interfaces with the support plate 15 of the pad 12,13 so as to press the friction portion 16 against the associable brake disc.

According to one embodiment, the support plate 15 comprises at least one guide hole 36 which receives in sliding coupling at least one axial guide 34 or 35 for the pad 12, 13.

According to one embodiment, the guide hole 36 is positioned at a radial end of the caliper body 8, on the opposite side to the connecting bridges 55 and 56 and/or 14, with respect to the piston 61.

According to one embodiment, the guide hole 36 receives the axial guide 34 or 35 with clearance so as to allow the axial sliding of the pads relative to said guide. In this regard, the guide hole 36 is preferably counter-shaped to the axial guide 34 or 35.

According to a general embodiment, a brake pad 12, 13 of the brake disc 2 comprises a support plate 15 to rest on the friction surfaces 4, 5 of a brake disc 2 having a thrust surface 18 to receive the thrust of at least one piston 61, or equivalent thrust means 60, and a friction surface 19 to which a friction portion 16 is associated, associated with said support plate 15 to rest on a friction surface 4, 5 of said brake disc 2.

Said disc brake defines an axial direction X-X parallel to the direction of rotation of the brake disc 2, a radial direction R-R orthogonal to said axial direction X-X and incident with it and a tangential or circumferential direction, T-T orthogonal to said axial direction X-X and said radial direction R-R. Said radial direction R-R defines an inward surface RI, when directed towards the axial direction coinciding with the rotation axis of the disc A-A, and an outward surface RE, when directed towards the opposite direction away from the axial direction coinciding with the rotation axis of the brake disc A-A.

According to one embodiment, said pad comprises a support plate edge which delimits said thrust surface 18 and friction surface 19.

According to one embodiment, said thrust plate edge 17 comprises an upper edge portion 28, substantially facing or directed outwards in said radial direction R-R. Said thrust plate edge 17 comprises a lower edge portion 20, substantially facing or directed inwards in said radial direction R-R. Said thrust plate edge 17 comprises two lateral edge portions 21, 22 opposite each other and substantially facing or directed in the tangential direction T-T, said lateral edge portions 21, 22 each comprise a lower lateral edge sub-portion 30, next to the lower edge portion 20, which extends by an extension less than or equal to a third of the longitudinal extension of said lateral edge portion 21, 22.

According to one embodiment, said upper edge portion 18 of said thrust plate edge 17 comprises at least one tab 23 forming a seat 24, open or closed.

Said tab defines a spring surface 25 facing or directed substantially in an inward sense RI in said radial direction R-R, to receive and support a thrust portion 26 of a spring device 27 adapted to stress the brake pad with at least one direct thrust component in the outward sense RE of said radial direction R-R.

According to one embodiment, all along said upper edge portion 28 there is no upper support portion of the caliper body 8, superiorly avoiding the support of the plate or of the pad by the caliper body 8 to exert a reaction to the thrust component having an outward direction RE to the stress action of the spring device 27.

According to one embodiment, a portion of the support plate 15 which is delimited by said lower lateral edge sub-portion 30, and/or by said lower edge portion 20, comprises a lower portion resting on the caliper body 31 support plate 15 defining a caliper support surface 32 resting on the support plate 15 of the caliper body 8 to exert a reaction to the thrust component of the spring device 27.

According to one embodiment, said caliper support surface substantially faces, or has a sense, in the outward sense RE of said radial direction R-R to rest the pad directly or indirectly on the caliper body 8, so that said pad is pulled radially outwards substantially in its entire radial extension in an outward sense RE.

Thanks to this solution, the pad is pulled outwardly, or the pad is pulled radially.

According to one embodiment, said caliper support surface 32 is made along said lower lateral edge sub-portion 30, and/or said lower edge portion 20 and substantially faces, or has a sense, in the outward sense RE of said radial direction R-R to rest on the caliper body 8.

According to one embodiment, said caliper support surface 32 is made inside said support plate 15 which delimits said lower lateral edge sub-portion 30, and/or said lower edge portion 20, in the manner of an open seat or alternatively a slotted hole, and substantially faces, or has a sense, in the outward sense RE of said radial direction R-R, to rest on a reaction device associated with the caliper body 8, for example a pad support pin 34 or a pad support screw 35.

According to one embodiment, said spring surface 25 is an undercut surface with respect to the upper edge portion 28.

According to one embodiment, said tab 23 forming said open or closed seat 24 defining said spring surface 25 is a bracket which protrudes in a cantilever from said support plate 15.

According to one embodiment, throughout said upper edge portion 28 only tabs 23 forming said open or closed seat 24 defining said spring surface 25 are present, avoiding other tabs, especially for the support of the caliper body.

According to one embodiment, said support plate 15 is an axial-symmetric shape with respect to a median line parallel to the radial direction R-R.

According to one embodiment, said upper edge 28 comprises two tabs 23 per spring. According to one embodiment, along the entire longitudinal extension of said upper edge 28 no other tabs are present with the exception of recesses or housings for wear sensors of the friction portion 16 of the pad 14; 15. According to one embodiment, said two tabs 23 are folded towards each other so that the two seats 24 are mutually facing. According to one embodiment, said two tabs 23 are folded in opposite directions so that the two seats 24 are opposite each other.

According to one embodiment, said spring surface 25 comprises at least one section directed in a tangential direction T-T.

According to one embodiment, said spring surface 25 comprises at least one inclined portion with respect to the tangential direction T-T which extends, moving away from said tangential direction T-T, for example a line passing through the plate edge, going towards the outward radial sense RE, opening an angle A towards the radial direction R-R between 30 DEG and 50 DEG, preferably 45 DEG.

According to one embodiment, said lower edge portion 20 is devoid of any spring surface 25 to receive the influence of a spring device 27.

According to one embodiment, said lower lateral edge sub-portion 30 is devoid of any spring surface 25 to receive the influence of a spring device 27.

According to one embodiment, said tab 23 forming said open or closed seat 24 defining said spring surface 25 is placed in proximity of the edge between said upper edge portion 28 and said lateral edge portion 21 and/or 22.

According to one embodiment, said spring surface 25 is facing said upper edge portion 28 positioned alongside the portion of friction material 16.

According to one embodiment, said seat 24 defining said spring surface 25 is a closed seat, for example in the shape of a slot.

According to one embodiment, said lower support portion of the caliper body 31 support plate 15 defining the caliper support surface 32 resting on the support plate of the caliper body 8, to exert a reaction to the thrust component having a radially outward sense RE of the stressing action of the spring device 27, is made in a support tab 33.

According to one embodiment, said support tab 33 protrudes in a cantilever from said lower lateral edge sub-portion 30, or said lower edge portion 20.

According to one embodiment, said support tab 33 protrudes in a tangential direction T-T away from said friction portion 16.

According to one embodiment, said support tab 33 protrudes in a tangential direction T-T away from said friction portion 16 substantially at or below the radially innermost portion of the friction portion 16.

According to one embodiment, said support tab 33 forms a cantilever bracket defining externally to itself the caliper support surface 32 resting on the support plate of the caliper body 8.

According to one embodiment, said support tab 33 forms a cantilever bracket defining internally or partially internally or in an undercut, the caliper support surface 32 resting on the support plate of the caliper body 8.

According to one embodiment, said support surface 32 is made as a slot 36 for supporting a portion of a pin 34 or screw 35, constrained to the caliper body.

According to one embodiment, said pad 14 and/or 15 is provided with one or more slots or eyelets 36 to receive corresponding pins 34; 35 of the caliper 8, wherein said pins 34; 35 define pin profiles 37 and said eyelets 36 define eyelet profiles 38, said pin profiles 37 having one or more curved pin contact portions 39 with pin curvature radii Rp and said eyelet profiles 38 having one or more curved eyelet contact portions 40 with eyelet curvature radii Ro, so that the contact between the pad 14 and/or 15 and the pins 34; 35 can take place at least partially at said pin 39 and eyelet 40 contact portions. According to one embodiment, the eyelet curvature radii Ro are greater than the pin curvature radii Rp.

According to one embodiment, said eyelet profiles 38 have a substantially rectangular or square shape with a rounded top outer corner 41, a bottom outer corner 42, a bottom inner corner 43 and a top inner corner 44. One or more of said rounded corners 41, 42, 43, 44 form said eyelet contact portions 40.

According to one embodiment, said eyelet profiles 38 of each eyelet 36 have only one of said eyelet contact portions 40 positioned at said rounded bottom outer corner 42.

According to one embodiment, the ratio between the height H of each eyelet 36 and the radius of eyelet curvature Ro of said single contact portion of eyelet 40 is in the range 2 to 2.1.

According to a general embodiment, a spring device 27 for a brake pad pulled outwards 12; 13 of the type described above, comprises a spring body 45 of the spring device.

According to one embodiment, said spring device body 45 comprises a coupling portion 46 to detachably couple the spring device 27 to the caliper body 8, for example, but not necessarily to the central bridge 14.

According to one embodiment, said spring device body 45 comprises a pad thrust portion 47 to press said pad 13, 14 pulling it towards the outward radial direction RE and to at least influence it away from a brake disc 2.

According to one embodiment, said pad thrust portion 47 comprises at least one thrust surface 48, which in the operating position, is directed substantially in the outward radial direction RE.

According to one embodiment, and in operating conditions, said thrust surface 48 is sloping passing towards the outside of the device in the axial direction X-X, proving inclined going towards the outside of the spring device 27 in the axial direction X-X, lowering itself in the inner radial direction RI gradually as it moves away.

According to one embodiment, said spring device 27 extends longitudinally in the tangential direction T-T and has an axially symmetrical shape with respect to a centreline S-S, parallel to the tangential direction T-T, wherein said thrust surface 48 is made in an end portion 49 of the spring device which moves away from said centreline S-S. According to one embodiment, said thrust surface 48 lowers moving away from said centreline S-S sloping in the axial direction X-X towards the inward radial direction RI.

According to one embodiment, said thrust surface 48 is inclined in the axial direction X-X going towards the inward radial direction RI opening an angle B from 5 to 15 DEG, preferably 10 DEG.

According to one embodiment, said thrust surface 48 is at least two sloping surfaces to influence the same pad 11, 12 in two separate positions.

According to one embodiment, said at least two sloping surfaces 48 are placed at the axial and tangential ends of the spring device 27.

According to one embodiment, said spring device 27 is a leaf spring, for example a shaped leaf spring.

According to one embodiment, said leaf spring 27 is a spring in a single piece.

According to one embodiment, said coupling portion 46 is adapted to couple to a central connecting bridge 14 of the caliper body 8 to connect in a substantially axial direction the two caliper half-bodies 9, 10. For examples, said coupling portion 46 externally radially embraces a portion of said central connecting bridge 14. According to one embodiment, said coupling portion 46 snap couples to undercut portions of said central connecting bridge 14.

According to one embodiment, said spring device comprises elastic arms 50 which connect said pad thrust portions 47 to said coupling portion 46.

A method of moving a brake pad 12, 13 of a disc brake assembly 3 away from a brake disc 2 will be described below.

According to one embodiment, said pad 12, 13 comprises a plate 15 provided with a plate edge 17 and a friction portion 16.

Said method comprises at least the steps of:
stressing at least one pad 12, 13 by means of at least one spring device 27 in the outward radial direction RE, applying the action in the vicinity of an upper edge portion 28 of the support plate edge 17;
avoiding counteracting the action of the spring device 27, resting the pad 12, 13 on the caliper body 8, in the vicinity of an upper edge portion 28;
counteracting the action of the spring device 27 resting the pad 12, 13 on the caliper body only in the vicinity of a lower edge portion 20 and/or a lower lateral edge sub-portion of the lower side edge 30 of a lateral edge portion 21; 22 of the support plate edge 17.

According to one way of carrying out said method; said at least one pad is stressed by at least one spring device 27 only in the vicinity of an upper edge portion 28 of the support plate edge 17.

According to one way of carrying out said method; said at least one pad 12; 13 is pulled radially between at least one application position of an elastic stress in the vicinity of its upper edge and a support portion on the caliper body 8 in proximity of a lower edge portion 20 and/or a lower lateral edge sub-portion 30 of a portion of lateral edge 21; 22 of the support plate edge 17.

A brake disc assembly 3 is described below which comprises a brake disc caliper 1 which houses at least one pad 12, 13 as described above.

According to one embodiment, said assembly 1 comprises in addition to the pad as described above, a spring device as described above.

Thanks to the pad, the spring and the assembly described above it is possible to satisfy the need expressed to reduce the residual torque determined by the undesired contact of the pad with the brake disc, especially of the residual torque determined by accidental and unwanted contact of the radially outward annular portion of the disc which, being distant from its constraint (the hat attached to the stub axle of the vehicle), deforms more in the axial direction X-X, widening in the axial direction. Thanks to the proposed solutions the disc is prevented from interfering with the friction portion of the brake pad.

Therefore, thanks to the pad, the spring and the assembly described above it is possible to meet the need expressed to distance the pad from the brake disc which deforms mainly in its radially outermost crown.

At the same time, it is possible to satisfy the contrasting need to distance the pad as little as possible from the friction surfaces of the disc to have a braking device ready or reactive to the braking request by the driver.

Thanks to the pad described above it is possible to provide a brake pad for a disc brake of new conception which, despite being suspended does not rotate moving further away from the disc in the axial direction at its radially innermost portion.

Thanks to the pad described above it is possible to provide a brake pad for a disc brake of new conception which is pulled in the radial direction by the action of an elastic device associated thereto, at least for most of its radial extension.

Thanks to the pad described above it is possible to provide a brake pad for a disc brake of new conception which increases the distance, in a radial direction, between the point of application on the pad of the elastic action and the point in which the brake pad rests on the caliper body.

Thanks to the spring device described above it is possible to provide a spring, for example but not necessarily a shaped leaf spring, which makes it possible to influence the pads associated to the caliper body of a disc brake and which makes it possible to press the pads away from the disc of the disc brake, avoiding creating annoying vibrations and high frequency noises or whistling and preventing the pads from vibrating against the braking surfaces of the disc, remaining in proximity of the disc even when the braking action is not required creating an unwanted residual braking torque.

The new and inventive concept of resting the pad described herein, among other things, is characterised in that the spring pulls the brake pads towards the outside of the disc and that contrast elements, such as supports, prevent the translation of the pad in such direction (planes, pins or sliding screws). Contrary to the prior solutions the arm which radially separates the point of application of the spring on the brake pad from the point where the pad rests on the caliper body i.e. the radial arm on which the spring works is very broad, permitting the use of less rigid springs for the same load, with, among others, the following benefits:

reduction of the variability of loads in the production of the spring in that less rigidity or a lower elastic constant for the same load is achieved with a greater deformation, but a reduced variability of the load in relation to the variability of the deflection permitted by the manufacturing tolerances of the spring;

the load applied by the spring remains more constant between the condition of new brake pads and worn brake pads increasing the efficiency of the caliper and improving the feeling of safe braking for the driver.

the spring maintains loads better even in the presence of high temperatures and additional deformations, deformations which it undergoes for example during assembly or during maintenance.

Figure 15:
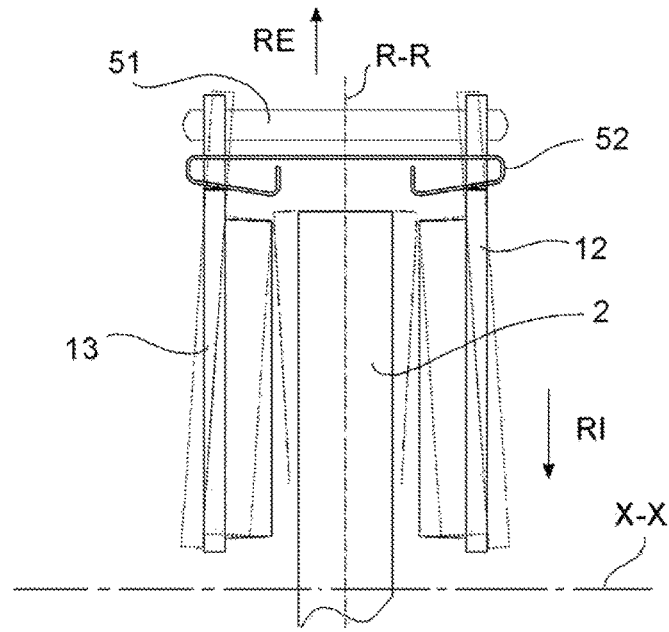
FIG. 15 is an axial cross-section of an assembly of pads suspended from a pad pin and fitted astride a brake disc, according to the state of the art.
Figure 16:
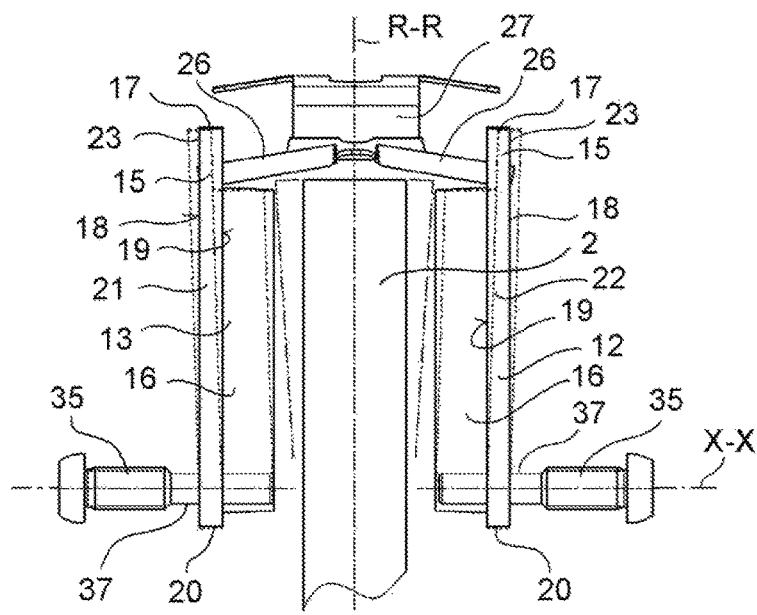
FIG. 16 is an axial cross-section of an assembly of pads suspended from a pad pin and fitted astride a brake disc, according to one embodiment of the invention.
Figure 17:
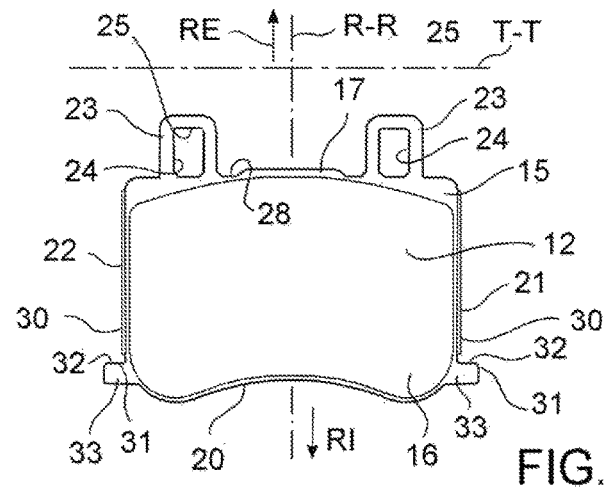
FIG. 17 is a view of a pad according to one embodiment of the present invention.
Figure 18:
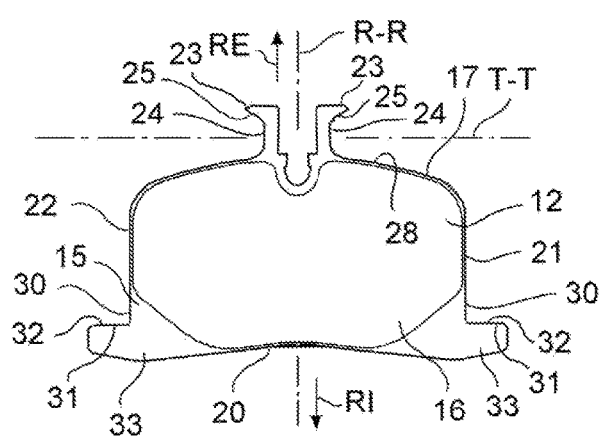
FIG. 18 is a view of a pad according to one embodiment of the present invention.
Figure 19:
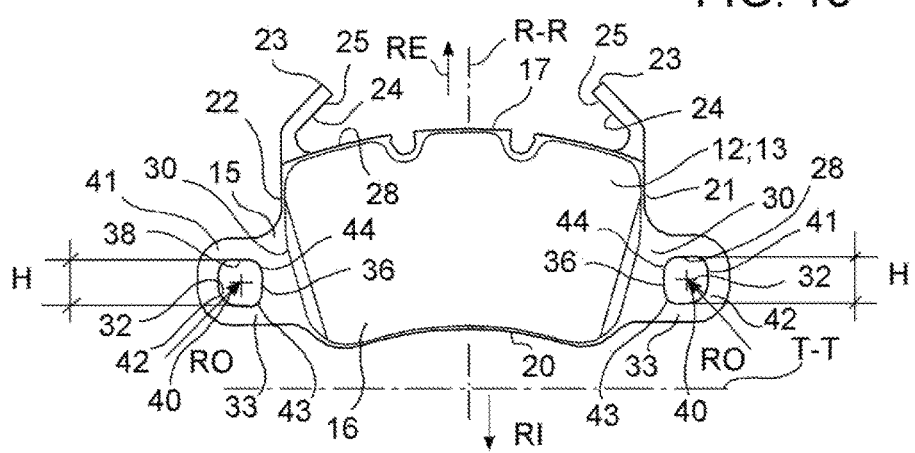
FIG. 19 is a view of a pad according to one embodiment of the present invention.

Another advantage of this solution is the reduction of residual torque due to the fact that the pads move away by effect of the spring starting from the radially outermost part, right where the disc deforms most, contrary to what happens with the suspended pads of the solutions of the prior art (FIG. 15).

Obviously, a person skilled in the art may make numerous modifications and variations to the assembly according to the invention so as to satisfy contingent and specific requirements while remaining within the sphere of protection of the invention as defined by the following claims.

| REFERENCES | |
|---|---|
| 1 | disc brake caliper |
| 2 | disc brake |
| 3 | disc brake assembly |
| 4 | friction surfaces |
| 5 | friction surfaces |
| 6 | inner wall of the half-caliper |
| 7 | outer wall |
| 8 | caliper body |
| 9 | half-body or half-calipers |
| 10 | half-body or half-calipers |
| 11 | housing compartment |
| 12 | first pad |
| 13 | second pad |
| 14 | central connecting bridge |
| 15 | support plate |

-continued

| | REFERENCES |
|---|---|
| 16 | friction portion |
| 17 | support plate edge |
| 18 | thrust surfaces |
| 19 | friction surfaces |
| 20 | lower edge portion |
| 21 | lateral edge portion |
| 22 | lateral edge portion |
| 23 | tab |
| 24 | seat |
| 25 | spring surface |
| 26 | thrust portion |
| 27 | spring device |
| 28 | upper edge portion |
| 29 | upper portion resting on the caliper body |
| 30 | lower lateral edge sub-portion |
| 31 | lower portion resting on the caliper body |
| 32 | caliper support surface |
| 33 | support tab |
| 34 | pad support pin |
| 35 | pad support screw |
| 36 | caliper pad support slot |
| 37 | pin profiles |
| 38 | eyelet profiles |
| 39 | pin contact portions |
| 40 | eyelet contact portions |
| 41 | top, outer corner |
| 42 | bottom, outer corner |
| 43 | bottom, inner corner |
| 44 | top, inner corner |
| 45 | spring device body |
| 46 | coupling portion |
| 47 | pad thrust portion |
| 48 | thrust surface of the spring device |
| 49 | end portion of the spring device |
| 50 | elastic arms |
| 51 | pad pin of the state of the art |
| 52 | state of the art spring |
| 53 | elongated element vehicle side |
| 54 | elongated element wheel side |
| 55 | first end bridge |
| 56 | second end bridge |
| 57 | hollow insert |
| 58 | closed bottom |
| 59 | outer wall |
| 60 | thrust means |
| 61 | piston |
| Rp | pin curvature radius |
| RO | eyelet curvature radii |
| X-X | axial direction |
| R-R | radial direction |
| T-T | tangential direction |
| S-S | centreline spring device parallel to the tangential direction |

The invention claimed is:

1. A brake pad of a disc brake for resting on first friction surfaces of a disc, said disc defining an X-X axis parallel to the direction of rotation of the disc, a radial axis orthogonal to and incident with said X-X axis and a tangential axis orthogonal to said X-X axis and said radial axis, said brake pad including a support plate having a thrust surface, the thrust surface positioned to receive a thrust of at least one piston, and a friction surface including a friction portion of said disc brake, said brake pad comprising: a support plate edge which delimits said thrust surface and a second friction surface, said support plate edge including an upper edge portion facing outwards along said radial axis, said support plate edge comprising a lower edge portion facing inward along said radial axis, said support plate edge comprising lateral edge portions facing along the tangential axis, said lateral edge portions including a lower lateral edge sub-portion next to the lower edge portion, the lower edge portion extending at most a third of the longitudinal extension of said lateral edge portions;

wherein said upper edge portion of said support plate edge comprises at least one tab forming a seat and defining a spring surface facing inward along said radial axis to receive and support a thrust portion of a spring device adapted to press the brake pad with at least one thrust component directed outward along said radial axis;

wherein said upper edge portion is spaced from the caliper body such that there is no upper support portion of the caliper body, superiorly avoiding the support of the plate or of the pad by the caliper body to exert an outward reaction to the thrust component along said radial axis to a stress action of the spring device;

wherein a portion of the support plate which is delimited by said lower lateral edge sub-portion and by said lower edge portion, comprises a lower caliper body support portion of the support plate, defining a caliper support surface supporting the support plate on the caliper body to exert a reaction to the thrust component of the spring device; and wherein said caliper support surface faces outward along said radial axis to rest on the caliper body, so that said brake pad is pulled radially outwards in an entire radial extension of the brake pad.

2. The brake pad of the disc brake according to claim 1, wherein:

said caliper support surface is positioned along said lower lateral edge sub-portion and said lower edge portion and faces outward along said radial axis and is positioned on the caliper body;

said caliper support surface positioned inside said support plate which delimits said lower lateral edge sub-portion and said lower edge portion in the manner of an open seat, and faces outward along said radial axis and positioned on a reaction device associated with the caliper body;

said spring surface is an undercut surface with respect to the upper edge portion;

said tab forming said seat defining said spring surface includes a bracket which protrudes in a cantilever from said support plate; and throughout said upper edge portion only tabs forming said seat defining said spring surface are present.

3. The brake pad of the disc brake according to claim 1, wherein:

said support plate is an axial-symmetric shape with respect to a median line parallel to the radial axis.

4. The brake pad of the disc brake according to claim 1, wherein:

said upper edge comprises two tabs per spring;

along the entire longitudinal extension of said upper edge no other tabs are present with the exception of recesses for wear sensors of the friction portion of the pad;

said two tabs are folded towards each other so that the seats are mutually facing; and said two tabs are folded in opposite directions so that the seats are opposite each other.

5. The brake pad of the disc brake according to claim 1, wherein:

said spring surface comprises at least one section directed along the tangential axis;

said spring surface comprises at least one inclined portion with respect to the tangential axis deflecting away from said tangential axis outward toward the radial axis, opening an angle towards the radial axis between 30 DEG and 50 DEG;

said lower edge portion is devoid of any spring surface;
said lower lateral edge sub-portion is devoid of any spring surface;
said tab forming said seat defining said spring surface is placed in proximity of an edge between said upper edge portion and said lateral edge portion;
said spring surface is facing said upper edge portion positioned alongside a portion of friction material; and
said seat defining said spring surface is a closed seat.

6. The brake pad of the disc brake according to claim 1, wherein:
said lower caliper body support portion of the support plate, defining a caliper support surface supporting the support plate on the caliper body to exert an outward reaction to the thrust component relative to the stress action of the spring device, is made in a support tab;
said support tab protrudes in a cantilever from said lower lateral edge sub-portion;
said support tab protrudes along the tangential axis away from said friction portion;
said support tab forms a cantilever bracket defining externally the caliper support surface supporting the support plate of the caliper body;
said support tab forms a cantilever bracket defining at least partially internally the caliper support surface supporting the support plate of the caliper body;
said support surface is a slot for supporting a portion of a pin;
said brake pad is provided with at least one eyelet to receive corresponding pins of the caliper, wherein said pins define pin profiles and said eyelets define eyelet profiles, said pin profiles having at least one curved pin contact portion with pin curvature radii and said eyelet profiles having at least one curved eyelet contact portion with eyelet curvature radii, so that contact between the brake pad and the pins can take place at least partially at said at least one curved pin contact portion and at least one curved eyelet contact portion, wherein the eyelet curvature radii are greater than the pin curvature radii;
said eyelet profiles have a rectangular shape with a rounded top outer corner, a bottom outer corner, a bottom inner corner and a top inner corner, at least one rounded corner forming said at least one curved eyelet contact portion;
said eyelet profiles of each eyelet have only one of said at least one curved pin contact portion positioned at said rounded bottom outer corner; and
a ratio between a height of each eyelet and the radius of eyelet curvature of said at least one curved eyelet contact portion is in the range 2 to 2.1.

7. The brake pad of the disc brake according to claim 1, further comprising a brake disc assembly comprising a brake disc caliper operable to house the brake pad.

8. The brake pad of the disc brake according to claim 7, further comprising a spring device for pulling the brake pad outwardly, the spring device including:
a spring device body;
said spring device body comprises a coupling portion to detachably couple the spring device to the caliper body; and
said spring device body comprising a pad thrust portion to influence said brake pad pulling the brake pad outward and to at least influence the brake pad away from the disc;
wherein said pad thrust portion comprises at least one thrust surface, which in the operating position, is directed substantially in the outward radial direction.

9. A brake pad of a disc brake housed in a caliper body having a caliper support plate and for resting on a disc, the brake pad comprising:
a support plate having a thrust surface;
a friction surface having a friction portion, the friction surface positioned on the support plate; and
a support plate edge which delimits the thrust surface and the friction surface, the support plate edge including an upper edge portion, a lower edge portion, and lateral edge portions, wherein the upper edge portion of the support plate edge includes at least one tab forming a seat and defining a spring surface facing inward,
wherein upper edge portion is spaced from the caliper body,
wherein a portion of the support plate comprises a lower caliper body support portion of the support plate, defining a caliper support surface operable to support the caliper body support portion, and
wherein the caliper support surface substantially faces outward and is positioned to rest on the caliper body, such that the brake pad is pulled radially outwards in an entire radial extension of the brake pad.

* * * * *